United States Patent [19]

Tarsy et al.

[11] Patent Number: 5,202,993
[45] Date of Patent: Apr. 13, 1993

[54] METHOD AND APPARATUS FOR COST-BASED HEURISTIC INSTRUCTION SCHEDULING

[75] Inventors: Gregory Tarsy, Scotts Valley; Michael J. Woodard, Fremont, both of Calif.

[73] Assignee: Sun Microsystems, Inc., Mountain View, Calif.

[21] Appl. No.: 661,674

[22] Filed: Feb. 27, 1991

[51] Int. Cl.$^5$ ............................. G06F 9/45; G06F 9/38
[52] U.S. Cl. ................................ 395/700; 364/DIG. 1; 364/230.1; 364/231.8; 364/232.3; 364/280.4
[58] Field of Search ................................. 395/700, 600

[56] References Cited

PUBLICATIONS

Gibbons, P. B. and Muchnick, S. S., "Efficient Instruction Scheduling for a Pipelined Architecture", Proc. of the SIG PLAN '86 Symp. on Computer Construction, 1986.

Primary Examiner—Gareth D. Shaw
Assistant Examiner—A. Katbab
Attorney, Agent, or Firm—Blakely, Sokoloff, Taylor & Zafman

[57] ABSTRACT

A method and apparatus for cost based heuristic instruction scheduling for a pipelined processor is disclosed which has particular application to compile time instruction scheduling after code generation. The method and apparatus schedules instructions of an instruction block one at a time, based on the lowest total cost among all the current eligible free instructions. The total cost of each of the current eligible free instructions is computed based on the weighted sum of a plurality of cost heuristics. The cost heuristics used in the preferred embodiment comprise a resource dependency cost, a data dependency cost, a dependency wait cost, a dependent cycle cost, a floating point ratio cost, a store ratio cost and a floating point queue cost. Additionally, in the preferred embodiment, a number of the cost heuristics are modeled by a processor model. As a result, improved overall effectiveness in speeding up the execution time of an instruction block is achieved.

34 Claims, 5 Drawing Sheets

INSTRUCTION BLOCK

| | | |
|---|---|---|
| 1 | ldd | [%i5], %f14 |
| 2 | fmuld | %f30, %f14, %f14 |
| 3 | std | %f22, [%i0-16] |
| 4 | ldd | [%i0], %f22 |
| 5 | faddd | %f22, %f14, %f22 |
| 6 | ldd | [%i5+8], %f20 |
| 7 | fmuld | %f30, %f20, %f20 |
| 8 | std | %f24, [%i0-8] |
| 9 | ldd | [%i0+8], %f24 |
| 10 | faddd | %f24, %f20, %f24 |
| 11 | inc | -2, %i3 |
| 12 | addcc | %i3, -1, %o0 |
| 13 | inc | 16, %i0 |
| 14 | bpos | L77596 |
| 15 | inc | 16, %i5 |

DEPENDENCY GRAPH

Free List
1
3
6
8
11

METHOD AND APPARATUS FOR COST-BASED HEURISTIC INSTRUCTION SCHEDULING

BACKGROUND OF THE INVENTION

1. Field of the Invention

The present invention is related to the field of computer systems. Specifically, the present invention relates to cost-based heuristic instruction scheduling for a pipelined processor.

2. Art Background

Instruction scheduling is a technique to significantly reduce the number of execution time pipeline interlocks for a basic block of instructions, and thereby improve the execution speed of the basic block of instructions. Generally, there are three approaches to reducing the number of pipeline interlocks in executing a basic block of instructions, distinguished by the agent and the timing:

a. by the hardware during execution,
b. by the programmer during coding,
c. by the software during compilation.

The hardware approach, while reasonably effective, is very expensive. The hardware approach is also limited to relatively small blocks of instructions. For further description on instruction scheduling via hardware, see Thornton, J. E., *Parallel Operation in the Control Data 6600*, Proceeding Fall Joint Computer Conference, Part 2, Vol 26, 1964, pp. 33-40, and Tomasuto, R. M., *An Efficient Algorithm for Exploiting Multiple Arithmetic Units*, IBM Journal of Research and Development, Vol 11, No. 1, January, 1967, pp. 25-33.

It has been found that the programmer approach is, in general, impractical, since it is very time consuming and error-prone. For further description on coding guidelines to avoid pipeline interlocks for assembly language programmers, see Rymarczyk, J. W., *Coding Guidelines for Pipelined Processors*, Proceeding of the Symposium on Architectural Support for Programming Languages and Operating Systems, Palo Alto, Calif. March, 1982, pp 12-19.

The software approach, particularly at compile time, to detect and remove interlocks, is at present, the most practical and effective approach. Earlier techniques tend to concentrate on the scheduling and compacting of microcode, packing a correct sequence of vertical microinstructions into a shorter sequence of horizontal microinstructions. Other techniques concentrated on scheduling during or after code generation. To date, empirical evidence suggests that heuristic instruction scheduling after code generation is more effective than the other techniques. For a survey of various techniques, see Gross, T. R., *Code Optimization of Pipeline Constraints*, Technical Report, 83-255, Computer Systems Lab., Stanford University, December, 1983.

In *Code Optimization of Pipeline Constraints*, Gross described a heuristic scheduling technique that uses look ahead to avoid deadlock, with a worst case complexity of $n^4$. By using a dependency graph representation and three heuristics in place of look ahead, Gibbons and Muchnick developed a heuristic scheduling technique with an improved worst case complexity of $n^2$ (linear in practice). Candidate instructions (instructions with no dependency) are analyzed in pairs. A candidate instruction is scheduled if it has a distinguishable difference over the other candidate instructions, in one of the three heuristics which are examined in orders of importance. The three heuristics are:

a. whether an instruction interlocks with any of its immediate successor instructions,
b. the number of immediate successor instructions of the instruction,
c. the length of the longest path from the instruction to the leaves of the dependency graph.

For further information on Gibbons and Muchnick's technique, see Gibbons P. B. and Muchnick S. S., *Efficient Instruction Scheduling for a Pipelined Architecture*, Proceedings of the SIGPLAN '86 symposium on compiler construction, July, 1986.

It has been found that the Gibbons and Muchnick technique and its progenies with added number of heuristics have at least two disadvantages:

a. there is limited interaction between the heuristics, except as secondary tie breakers,
b. a small difference in a slightly more important heuristic may outweigh a large difference in a slightly less important heuristic.

As will be described, the present invention overcomes the disadvantages of the prior art, and provides an improved method and apparatus for cost-based heuristic instruction scheduling for a pipelined processor.

SUMMARY OF THE INVENTION

A method and apparatus for cost-based heuristic instruction scheduling for a pipelined processor is disclosed which has particular application to compile time instruction scheduling after code generation.

The method for cost-based heuristic instruction scheduling for a pipelined processor of the present invention comprises the steps of building an instruction dependency graph for a block of instructions to be scheduled, building a free instruction list for the instructions based on the instruction dependency graph, and scheduling one of the free instructions based on the lowest total cost, the total cost for each of the free instructions being computed based on a plurality of cost heuristics. Additionally, the free instruction list refreshed after a free instruction is scheduled and another one of the free instructions from the refreshed list is scheduled. The refreshing and scheduling is repeated until the instructions of the instruction block are all scheduled.

The cost heuristics comprise a resource dependency cost, a data dependency cost, a dependency wait cost, a dependent cycle cost, a floating point ratio cost, a store ratio cost, and a floating point queue cost. Additionally, the cost heuristics may be modeled by a processor model and/or weighted.

The apparatus for cost-based heuristics instruction scheduling for a pipeline processor of the present invention comprises a driver procedure, a dependency graph building procedure called by the driver procedure for building an instruction driver graph, a list building procedure called by the driver graph building procedure for building and refreshing a free instruction list, and a scheduling procedure called by the driver procedure for scheduling one of the free instructions. Additionally, the preferred embodiment of the apparatus of the present invention further comprises a processor model called by the scheduling procedure for modeling the cost heuristics.

NOTATIONS AND NOMENCLATURE

Figure 1:
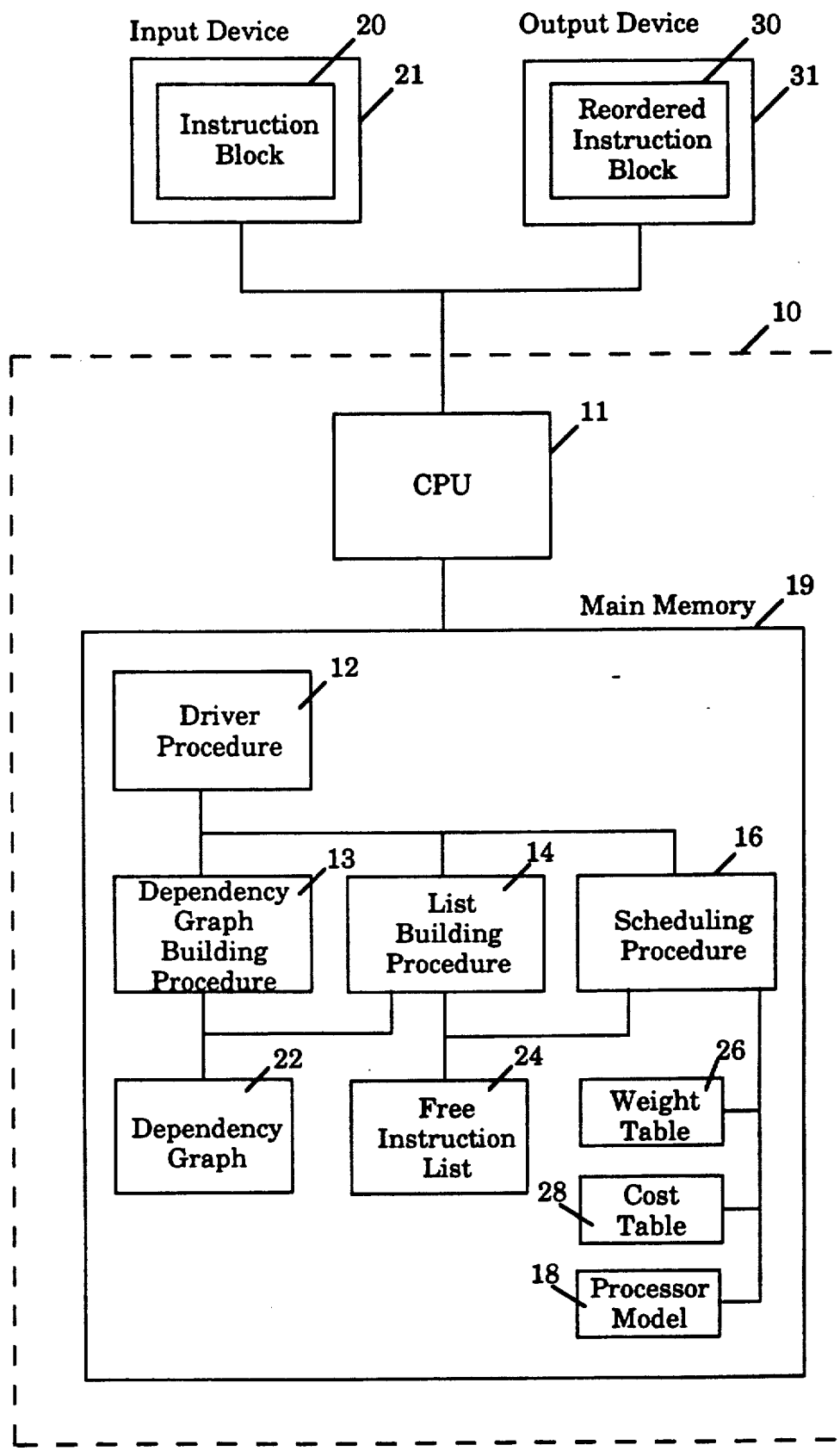
FIG. 1 shows a block diagram illustrating the preferred embodiment of the apparatus of the present invention. The preferred embodiment of the apparatus comprises a driver procedure, a dependency graph building procedure, a free instruction list building procedure, an instruction scheduling procedure and a processor model.

The detailed description which follows is presented largely in terms of procedures within a computer memory executed by a central processing unit. These procedure descriptions are the means used by those skilled in the data processing arts to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be borne in mind that there is a distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for cost-based heuristic instruction scheduling for a pipelined processor is disclosed which has particular application to compile time instruction scheduling after code generation. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, a block diagram illustrating the preferred embodiment of the apparatus for cost-based heuristic instruction scheduling for a pipelined processor is shown. The preferred embodiment of the apparatus of the present invention 10 comprises a CPU 11, and a main memory 19 comprising a plurality of procedures/model 12-18 being executed by the CPU 11. The main memory 19 further comprises a plurality of data structures 22-28 accessed by the executing procedures/model 12-18.

The CPU 11 is for executing the procedures/model 12-18 within the main memory 19. The CPU 11 comprises an input/output interface for reading an instruction block 20 from an input device 21 for the procedures/model 12-18 being executed and for writing an ordered instruction block 30 to an output device 31 generated by the procedures/model 12-18 being executed.

The main memory 19 is for storing the procedures/model 12-18 being executed by the CPU 11 and the data structures 22-28 accessed by the executing procedures/model 12-18. The main memory 19 coupled to the CPU 11 comprises a driver procedure 12, a dependency graph building procedure 13 called by the driver procedure 12, a list building procedure 14 called by the driver procedure 12, a scheduling procedure 16 called by the driver procedure 12 and a processor model 18 called by the scheduling procedure 16. The main memory 19 further comprises a dependency graph 22, a free instruction list 24, a weight table 26, and a cost table 18.

The driver procedure 12 is for driving the cost-based heuristic instruction scheduling process. The driver procedure 12 comprises an interface (not shown) for receiving the block of instructions 20 as input. Upon receipt of an instruction block 20 as input, the driver procedure 12 calls the dependency graph building procedure 13, the list building procedure 14 and the scheduling procedure 16 in sequence to schedule the instructions.

The dependency graph building procedure 13 is for building an instruction dependency graph for a block of instructions comprising a plurality of instructions to be scheduled 20. The dependency graph building procedure 13 called by the driver procedure 12 receives the block of instructions 20 as input.

Upon receipt of an instruction block 20 as input, the dependency

Upon receipt of an instruction block 20 as input, the dependency

Upon receipt of an instruction block 20 as input, the dependency

Upon receipt of an instruction block 20 as input, the dependency

Figures 2A, 2B, 2C:
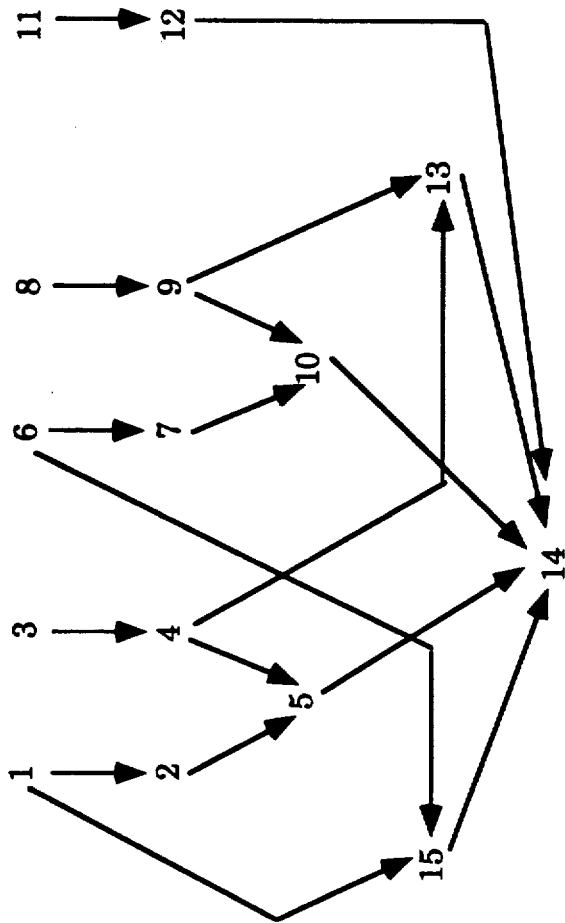
FIG. 2a shows a block diagram illustrating an exemplary instruction block.
FIG. 2b shows an exemplary corresponding instruction dependency graph built by the dependency graph building procedure of the apparatus of the present invention.
FIG. 2c shows an exemplary corresponding free instruction list build by the list building procedure of the apparatus of the present invention.

Upon receipt of an instruction block 20 as input, the dependency precede it. From the definitions and uses noted, the dependency graph building must precede it. From the definitions and uses noted, the dependency graph building procedure 13 builds the instruction dependency graph 22. An exemplary instruction dependency graph is also shown in FIG. 2b. After building the instruction dependency graph 22, the dependency graph building procedure 13 returns to the driver procedure 12. For further description on building instruction dependency graphs, see Gibbons P. B. and Muchnick S. S., *Efficient Instruction Scheduling for a Pipelined Architecture*, Proceedings of the SIGPLAN '86 symposium on compiler construction, July 1986, pp 12-13.

Continuing referring to FIG. 1, the list building procedure 14 is 22. 22. The list building procedure 14 is called by the driver procedure 12 after returning from the dependency graph building procedure 13. Upon initial invocation by the driver procedure 12, the list building procedure 14 accesses the instruction dependency graph 22, and builds the free instruction list 24. The list building procedure 14 builds the free instruction list 24 by scanning across the instruction dependency graph 22 forward, beginning with the roots of the instruction dependency graph 22. An instruction is free if all of its immediate predecessor instructions in the instruction dependency graph have been scheduled. An exemplary initial free instruction list is also shown in FIG. 2c. After building the instruction free list 24, the list building procedure 14 returns to the driver procedure 12.

The list building procedure 14 is also for refreshing the free instruction list 24. The list building procedure 14 is called by the driver procedure 12 again after returning from the scheduling procedure 16. Upon subsequent invocation by the driver procedure 12, the list building procedure 14 refreshes the free instruction list 24 by deleting the instruction scheduled and adding the successor instructions becoming free due to the scheduling of the scheduled instruction. The list building procedure 14 scans for the successor instructions in the same manner as it scans for the initial free instructions. After refreshing the free instruction list 24, the list building procedure 14 returns to the driver procedure 12 again as previously described. The list building procedure 14 is called by the driver procedure 12 repeatedly after each return from the scheduling procedure 16 for refreshing the free instruction list 24 until the free instruction list 24 becomes empty, that is, all instructions are scheduled. For further information on free instruction list building and refreshing, see Gibbons P. B. and Muchnick S. S., *Efficient Instruction Scheduling for a Pipelined Architecture*, Proceedings of the SIGPLAN '86 symposium on compiler construction, July 1986.

The scheduling procedure 16 is for scheduling a free instruction. The scheduling procedure 16 is called by the driving procedure 12 after each return from the list building procedure 14. Upon invocation by the driver procedure 12, the scheduling procedure 16 accesses the free instruction list 24 and schedules one of the free instruction. The scheduling procedure 16 returns to the driver procedure 12 after scheduling one of the free instructions. The scheduling procedure 16 schedules one of the free instructions based on the lowest total cost of the free instructions. The total cost of each of the free instructions is computed based on the weighted sum of a plurality of cost heuristics. The weights are obtained by accessing the weight table 26. The costs of some of the cost heuristics are determined by calling the processor model 18, others are computed directly. The total cost of each of the scheduled free instructions and the total cost of the instruction block are stored in the cost table 28. The cost heuristics and the processor model 18 will be discussed in further details later.

Figure 3:
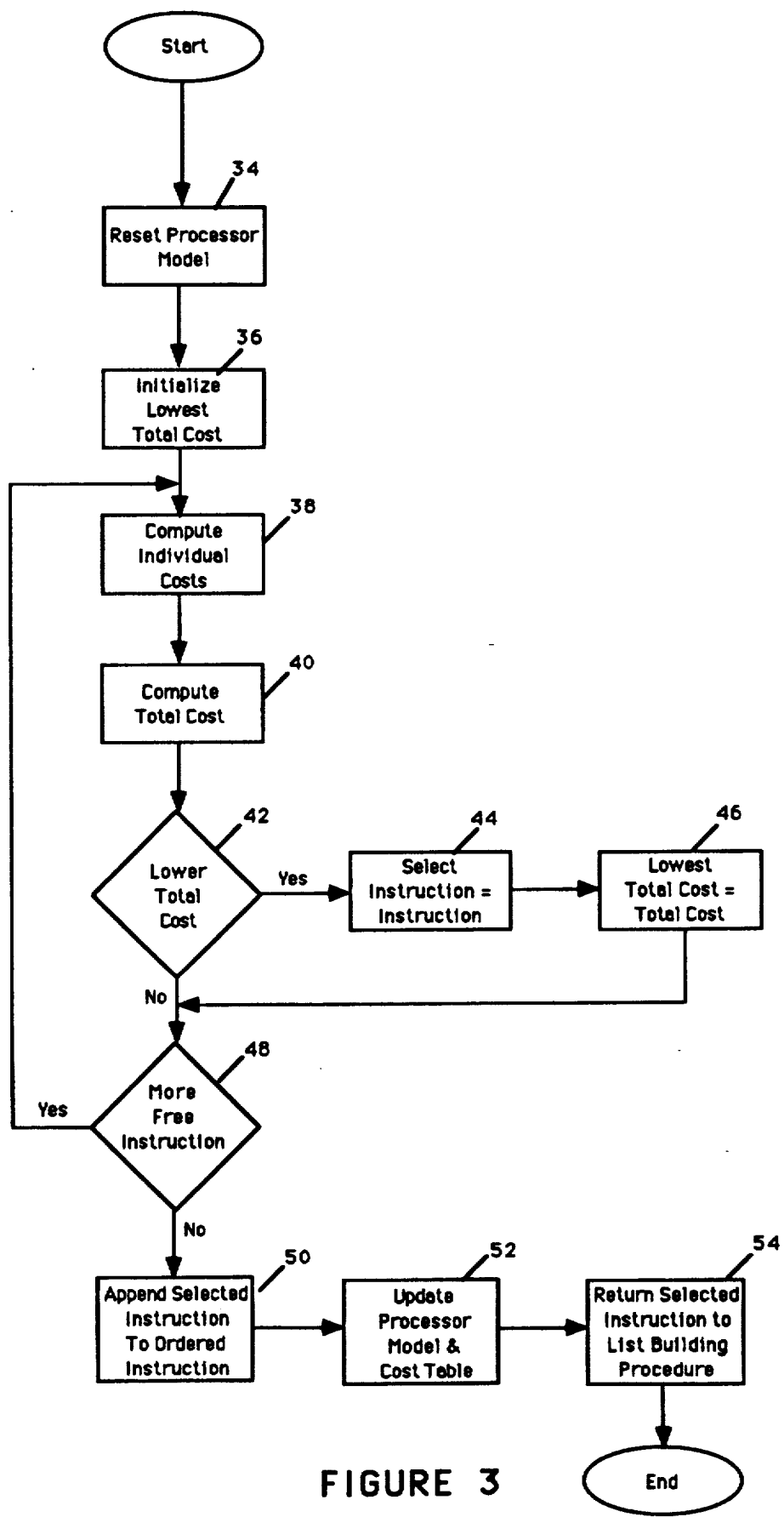
FIG. 3 shows a block diagram illustrating the operation flow of the scheduling procedure of the apparatus of the present invention.

Referring now to FIG. 3, a block diagram illustrating the operation flow of the scheduling procedure is shown. Upon invocation by the driver procedure, the scheduling procedure causes the processor model to be reset 34. After resetting the processor model 34, the scheduling procedure computes the total cost for the first free instruction on the free instruction list. The scheduling procedure initializes the lowest total cost 36, computes the cost for each of the cost heuristics 38, and computes the total cost 40 based on a weighted sum of the cost heuristics.

After computing the total cost of a free instruction 40, the scheduling means determines if the computed total cost is lower than the current lowest total cost 42. If the computed total cost is lower than the current lowest total cost, the scheduling procedure marks the current instruction as the current selected instruction 44 and sets the current lowest total cost to the newly computed total cost 46.

After determining the computed total cost is not lower than the current lowest total cost or after marking the current instruction and setting the current lowest total cost, the scheduling procedure determines if there are any more free instructions on the free instruction list to be analyzed 48. If there are additional free instructions to be analyzed, the scheduling procedure repeats the cost computation and cost comparison described above.

After repeating the cost computation and cost comparison for all the free instructions on the free instruction list, the scheduling procedure appends the current selected instruction to the ordered instruction list 50. Additionally, the scheduling procedure causes the processor model and the cost table to be updated 52, and returns the selected instruction to the list building procedure 54.

Figure 4:
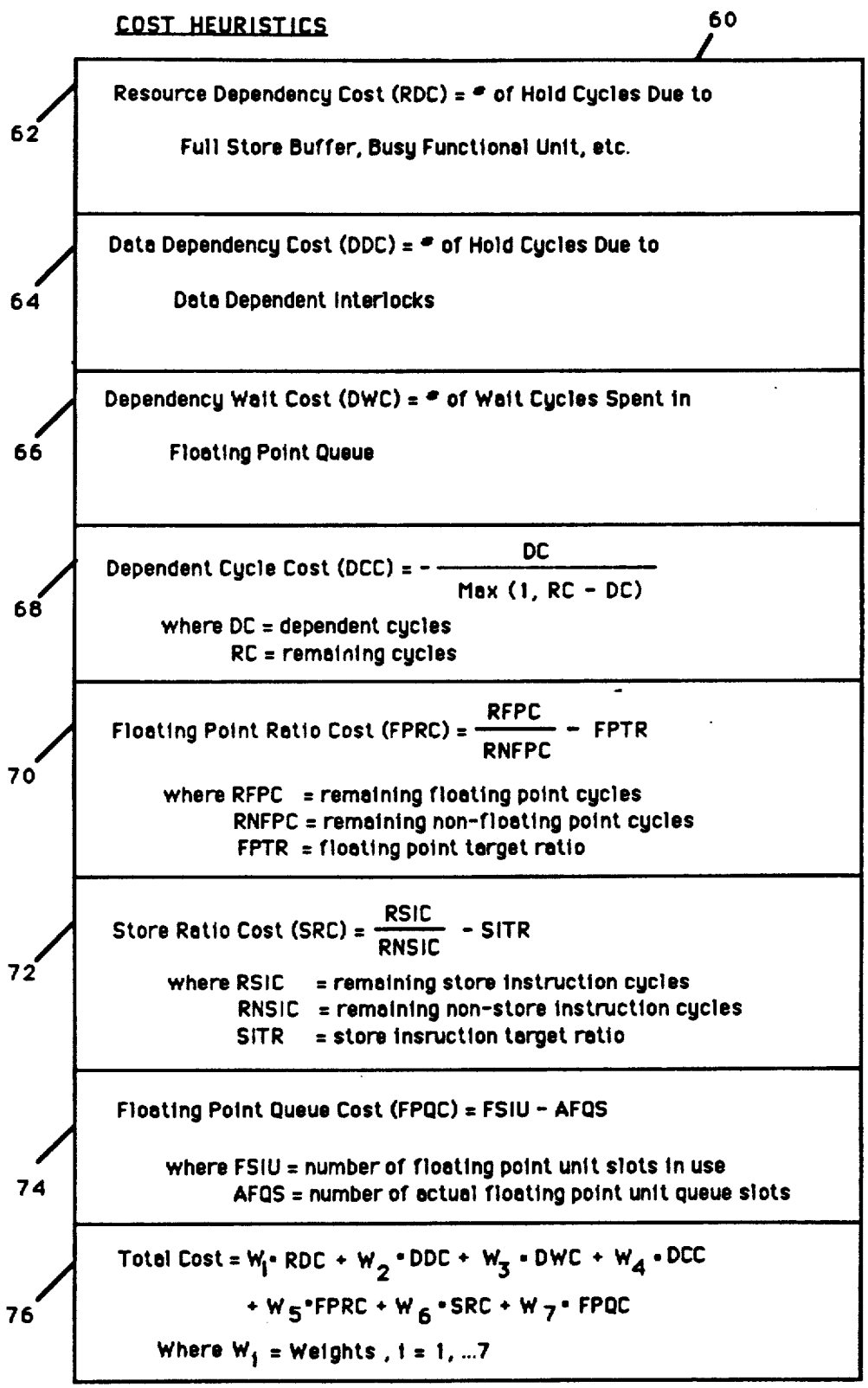
FIG. 4 shows a table of the cost heuristics used by the preferred embodiment of the apparatus of the present invention. The cost heuristics comprise a resource dependency cost, a data dependency cost, a dependency wait cost, a dependent cycle cost, a floating point ratio cost, a store ratio cost and a floating point queue cost.

Referring now to FIG. 4, a table illustrating the cost heuristics used by the preferred embodiment of the apparatus of the present invention is shown. The cost heuristics comprises a resource dependency cost 62, a data dependency cost 64, a dependency wait cost 66, a dependent cycle cost (DCC) 68, a floating point ratio cost (FPRC) 70, a store ratio cost (SRC) 72 and a floating point queue cost (FPQC) 74. The total cost 76 is a weighted sum of these cost heuristics 62–74.

The resource dependency cost 62 is for measuring the cost of hold cycles due to unavailable processor resources caused by scheduling a particular free instruction. The resource dependency cost 62 equals the number of hold cycles due to unavailable processor resources such as full store buffer, or a busy functional unit. The resource dependency cost 62 is computed by interrogating the processor model. It will be appreciated that this cost heuristic tends to schedule a free instruction at a point where it will cause the fewest number of hold cycles.

The data dependency cost 64 is for measuring the cost of hold cycles due to data dependent interlocks caused by scheduling a particular free instruction. The data dependency cost 64 equals the number of hold cycles due to data dependent interlocks such as load-use interlocks and delays associated with storing values in registers after multi-cycle floating point operations. Similar to resource dependency cost 62, the data dependency cost 64 is computed by interrogating the processor model. It will be appreciated that this cost heuristic also tends to schedule a free instruction at a point where it will cause the fewest number of hold cycles.

The dependency wait cost 66 is for measuring the cost of extra cycles due to waiting in a queue caused by scheduling a particular free instruction. The dependency wait cost 66 equals the number of extra cycles due to waiting in a queue such as a floating point queue. Similar to resource dependency cost 62, the dependency wait cost 66 is computed by interrogating the processor model. It will be appreciated that this cost heuristic tends to schedule a free instruction at a point where it will cause the fewest number of extra wait cycles.

The dependent cycle cost (DCC) 68 is for measuring the relative cost of dependent cycles caused by scheduling a particular free instruction. The dependent cycle cost (DCC) 66 equals the negation of the ratio of a free instruction's dependent cycles to independent cycles within the instruction block, that is $$DCC = -DC/\max(1, RC-DC)$$

where
DC is the number of dependent cycles on the free instruction, and
RC is the number of cycles required for the remaining instructions of the instructions block.

It will be appreciated that this cost heuristic tends to schedule a free instruction with larger number of dependent cycles over a free instruction with smaller number of dependent cycles. It will also be appreciated that this cost heuristic assigns a greater significance to the number of dependent cycles of a free instruction as more and more instructions of an instruction block are scheduled.

The floating point ratio cost (FPRC) 70 is for measuring the relative cost of floating point cycles caused by scheduling a particular free instruction. The floating point ratio cost (FPRC) 70 equals the difference between the ratio of remaining floating point cycles to remaining non-floating point cycles and a floating point target ratio (FPTR) of floating point cycle to non-floating point cycles, that is $$FPRC = (RFPC/RNFPC) - FPTR$$

where
RFPC is the number of remaining floating point cycles,
RNFPC is the number of remaining non-floating point cycles, and
FPTR is the floating point target ratio.

The floating point target ratio (FPTR) may be adjusted dynamically after scheduling one of the free instructions. It will be appreciated that this cost heuristic tends to distribute free floating point instructions uniformly throughout the remainder of the instruction block, thus avoiding clogging the floating point queue.

The store ratio cost (SRC) 72 is for measuring the relative cost of store cycles caused by scheduling a particular free instruction. The store ratio cost (SRC) 72 equals the difference between the ratio of remaining store instruction cycles to remaining non-store instruction cycles and a target ratio of store instruction cycle to non-store instruction cycles, that is $$SRC = (RSIC/RNSIC) - SITR$$

RSIC is the number of remaining floating point cycles,
RSIC is the number of remaining floating point cycles,
RSIC is the number of remaining floating point cycles,
RSIC is the number of remaining floating point cycles,
SITR is the floating point target ratio.

Similar to the floating point target ratio (FPTR), the store instruction target ratio (SITR) may also be adjusted dynamically after scheduling one of the free instructions. It will be appreciated that this cost heuristic tends to distribute store instructions uniformly throughout the remainder of the instruction block, thus avoiding clogging the store data buffers.

The floating point queue cost (FPQC) 74 is for measuring the cost of floating point queue slots caused by scheduling a particular free instruction. The floating point queue cost (FPQC) 74 for a non-floating point free instruction equals zero. The floating point queue cost (FPQC) 74 for a floating point free instruction equals the difference between the number of floating point queue slots in use and the total number of floating point queue slots, that is $$FPQC = FSIU - AFQS$$

where
FSIU is the number of floating point operations currently being held in the floating point queue, and
AFQS is the actual number of slots on the floating point queue for holding floating point operations.

It will be appreciated that this cost heuristic tends to schedule a free floating point instruction when there are unused slots in the floating point queue for holding floating point operations.

The total cost 76 is for measuring the total cost of scheduling a particular free instruction factoring in all the cost heuristics described above. The total cost 76 equals the weighted sum of the cost heuristics. The weights may be assigned in any manner reflecting the relative importance of the cost heuristics.

Figure 5:
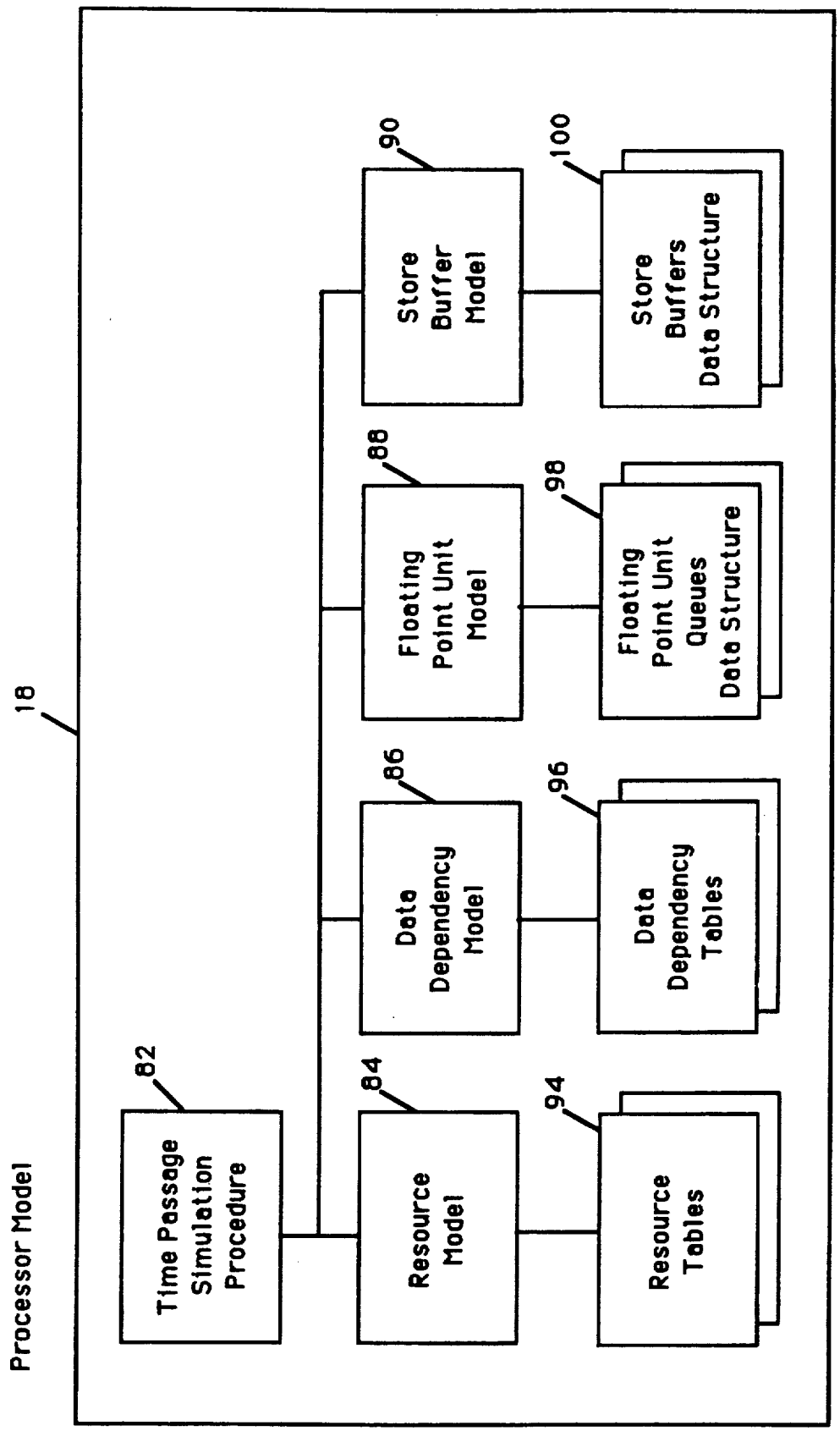
FIG. 5 shows a block diagram illustrating the processor model of the preferred embodiment of the apparatus of the present invention. The processor model comprises a time passage simulation procedure, a plurality of component models and a plurality of tables/queues/buffers.

Referring now to FIG. 5, a block diagram illustrating the processor model of the preferred embodiment of the apparatus of the present invention is shown. The processor model 18 comprises a time passage simulation procedure 82, a plurality of component models 84-90 called by the passage simulation procedure 82, and a plurality of corresponding component tables 94, 96 or component queue 98, or component buffer 100.

The time passage simulation procedure 82 is for simulating clock cycles and instruction execution in a pipelined processor. The time passage simulation procedure 82 comprises an interface for receiving a free instruction from the scheduling procedure as input. Upon receipt of a free instruction from the scheduling procedure, the time passage simulation procedure 82 causes the appropriate component models 84-90 to simulate the cost of scheduling a particular free instruction and returns the simulated cost to the scheduling procedure. The time passage simulation procedure 82 also receives a plurality of signals from the scheduling means as inputs, through the same interface, for initializing and resetting the various component models 84-90.

In the preferred embodiment, the component models 84-90 comprises a resource model 84, a data dependency model 86, a floating point unit model 88, and a store buffer model 90. The component tables/simulated queues/simulated buffers 94-100 comprises at least one resource table 94, at least one data dependency table 96, at least one floating point queue 98 and at least one store buffer 100.

The resource model 84 is for modeling hold cycles due to unavailable processor resources. The resource model 84 coupled to the time passage simulation procedure 82 receives a free instruction as input. Upon receipt of a free instruction, the resource model 84 simulates the cost of hold cycles due to unavailable processor resources caused by scheduling the particular free instruction, and returns the simulated cost to the time passage simulation procedure 82 for return to the scheduling procedure. The resource model 84 also receives a plurality of signals from the time passage simulation procedure 82 for initializing and resetting the resource model 84.

The resource tables 94 are for holding various processor resource information. The resource tables 94 coupled to the resource model 84 are initialized, updated and accessed by the resource model 84.

The data dependency model 86 is for modeling hold cycles due to data dependent interlocks. The data dependency model 86 coupled to the time passage simulation procedure 82 receives a free instruction as input. Upon receipt of a free instruction, the data dependency model 86 simulates the cost of hold cycles due to data dependent interlocks caused by scheduling the particular free instruction, and returns the simulated cost to the time passage simulation procedure 82 for return to the scheduling procedure. The data dependency model 86 also receives a plurality of signals from the time passage simulation procedure 82 for initializing and resetting the data dependency model 86.

The data dependency tables 96 are for holding various data dependency information. The data dependency tables 96 coupled to the data dependency model 86 are initialized, updated and accessed by the data dependency model 86.

The floating point unit model 88 is for modeling wait cycles spent in the floating point queue. The floating point unit model 88 coupled to the time passage simulation procedure 82 receives a free instruction as input. Upon receipt of a free instruction, the floating point unit model 88 simulates the cost of wait cycles spent in the floating point queue caused by scheduling the particular free instruction, and returns the simulated cost to the time passage simulation procedure 82 for return to the scheduling procedure. The floating point unit model 88 also receives a plurality of signals from the time passage simulation procedure 82 for initializing and resetting the floating point unit model 88.

The floating point queues data structure 98 are for simulating the floating point queues in the pipelined processor. The floating point queues data structure 98 coupled to the floating point unit model 88 are initialized, updated and accessed by the floating point unit model 88.

The store buffer model 90 is for modeling hold cycles due to full store buffer. The store buffer model 90 coupled to the time passage simulation procedure 82 receives a free instruction as input. Upon receipt of a free instruction, the store buffer model 90 simulates the cost of hold cycles due to full store buffer caused by scheduling the particular free instruction, and returns the simulated cost to the time passage simulation procedure 82 for return to the scheduling procedure. The store buffer model 90 also receives a plurality of signals from the time passage simulation procedure 82 for initializing and resetting the store buffer model 90.

The store buffers data structure 100 are for simulating the store buffers in the pipelined processor. The store buffers data structure 100 coupled to the store buffer model 90 are initialized, updated and accessed by the store buffer model 90.

While the invention has been described in terms of a preferred embodiment, those skilled in the art will recognize that the invention is not limited to the cost heuristics described or the components modeled. The apparatus of the present invention can be practiced with modification and alteration within the spirit and scope of the appended claims.

What is claimed is:

1. A method for cost-based heuristic instruction scheduling instructions for execution in a pipelined processor, said instructions comprising definitions, resources for use in said pipeline processor, or definitions and resources for use in said pipelined processor, said method comprising the steps of:

building an instruction dependency graph data structure for an instruction block, said instruction block comprising a plurality of instructions to be scheduled and said dependency graph data structure comprising said plurality of instructions arranged in a serial relationship such that a higher level instruction will precede a lower level instruction when definitions or use of a resource of said higher level instruction are necessary for said pipelined processor to execute said lower level instruction;

accessing free instructions in said instruction dependency graph data structure, said free instructions comprising instructions that do not have a higher preceding instruction;

building a free instruction list data structure comprising said free instructions;

providing a plurality of component modeling means for determining a plurality of cost heuristics for said pipelined processor;

simulating clock cycles and instruction execution in said pipelined processor for each of said free instructions so as to determine a plurality of cost heuristics by accessing said component modeling means for said plurality of cost heuristics;

computing a total cost for each free instruction by summing said plurality of cost heuristics;

building a cost table data structure comprising said total cost for each free instruction; and scheduling for execution in said pipelined processor one of said free instructions based on a lowest total cost in said cost table data structure wherein execution time pipeline interlocks in said pipelined processor are reduced thereby improving execution speed in said pipelined processor for said plurality of instructions in said instruction block.

2. The method for cost-based heuristic instruction scheduling for execution in a pipelined processor as set forth in claim 1, wherein said method further comprises the steps of:

refreshing said free instruction list data structure for the remaining instructions based on said instruction dependency graph data structure, excluding said scheduled instruction and including said instructions that become free due to said scheduled instruction;

updating said component modeling means after scheduling each of said free instructions;

simulating clock cycles and instruction execution in said pipelined processor for each of said free instructions so as to determine a plurality of cost heuristics by accessing said component modeling means;

computing a total cost for each free instruction by summing said plurality of cost heuristics;

building a refreshed cost table data structure comprising said total cost for each free instruction; and scheduling another one of said refreshed list of free instructions for execution said pipeline processor based on a lowest total cost in said refreshed cost table data structure.

3. The method for cost-based heuristic instruction scheduling for a pipelined processor as set forth in claim 2, wherein said steps of refreshing said free instruction list, updating said component modeling means and scheduling another one of said refreshed list of free instructions are repeated until said instructions of said instruction block are all scheduled.

4. The method for cost-based heuristic instruction scheduling for a pipelined processor as set forth in claim 3, wherein said plurality of cost heuristics comprise a resource dependency cost, said resource dependency cost equaling the number of hold cycles due to resource dependencies caused by scheduling said free instruction.

5. The method for cost-based heuristic instruction scheduling for a pipelined processor as set forth in claim 3, wherein said plurality of cost heuristics comprise a data dependency cost, said data dependency cost equaling the number of data interlocks due to data dependencies caused by scheduling said free instruction.

6. The method for cost-based heuristic instruction scheduling for a pipelined processor as set forth in claim 3, wherein said plurality of cost heuristics comprise a dependency wait cost, said dependency wait cost equaling the number of extra wait cycles for resources caused by scheduling said free instruction.

7. The method for cost-based heuristic instruction scheduling for a pipelined processor as set forth in claim 3, wherein said plurality of cost heuristics comprise a dependent cycle cost (DCC), said dependent cycle cost (DCC) equaling $-DC/\max(1, RC-DC)$, where DC equals the number of dependent cycles on said free instruction, RC equals the number of cycles required for the remaining instructions of said instruction block.

8. The method for cost-based heuristic instruction scheduling for a pipelined processor as set forth in claim 3, wherein said plurality of cost heuristics comprise a floating point ratio cost (FPRC), said floating point ratio cost (FPRC) equaling $(RFPC/RNFPC)-FPTR$, where RFPC equals the number of floating point cycles required for the remaining instructions of said instruction block after scheduling said free instruction, RNFPC equals the number of non-floating point cycles required for the remaining instructions of said instruction block after scheduling said free instruction, FPTR equals a floating point target ratio of floating point cycles required to non-floating point cycles required for said instruction block.

9. The method for cost-based heuristic instruction scheduling for a pipelined processor as set forth in claim 8, wherein said floating point target ratio (FPTR) is adjustable, said floating point target ratio (FPTR) being adjusted after each of said scheduling of said free instructions.

10. The method for cost-based heuristic instruction scheduling for a pipelined processor as set forth in claim 3, wherein said plurality of cost heuristics comprise a store ratio cost (SRC), said store ratio cost (SRC) equaling $(RSIC/RNSIC)-SITR$, where RSIC equals the number of store instruction cycles required for the remaining instructions of said instruction block after scheduling said free instruction, RNSIC equals the number of non-store instruction cycles required for the remaining instructions of said instruction block after scheduling said free instruction, SITR equals a store instruction target ratio of store instruction cycles required to non-store instruction cycles required for said instruction block.

11. The method for cost-based heuristic instruction scheduling for a pipelined processor as set forth in claim 10, wherein said store instruction target ratio (SITR) is adjustable, said store instruction target ratio (SITR) being adjusted after each of said scheduling of said free instructions.

12. The method for cost-based heuristic instruction scheduling for a pipelined processor as set forth in claim 3, wherein said plurality of cost heuristics comprise a floating point queue cost (FPQC), said floating point queue cost (FPQC) equaling zero for said free instruction that is a non-floating point instruction, and equaling $FSIU-AFQS$ for said free instruction that is a floating point instruction, where FSIU equals the number of floating point operations currently being held in the floating point queue, and AFQS is the initial number of slots available on the floating point queue for holding floating point operations.

13. The method for cost-based heuristic instruction scheduling for a pipelined processor as set forth in claim 3, wherein said plurality of component modeling means comprise a resource model and at least one resource table, said resource tables being initialized for said instruction block, and updated after each of said scheduling of said free instructions.

14. The method for cost-based heuristic instruction scheduling for a pipelined processor as set forth in claim 3, wherein said plurality of component modeling means comprise a data dependency model and at least one data dependency table, said data dependency tables being initialized for said instruction block, and updated after each of said scheduling of said free instructions.

15. The method for cost-based heuristic instruction scheduling for a pipelined processor as set forth in claim 3, wherein said plurality of component modeling means comprise a floating point unit model and at least one simulated floating point unit queue, said simulated floating point unit queues being initialized for said instruction block, and updated after each of said scheduling of said free instructions.

16. The method for cost-based heuristic instruction scheduling for a pipelined processor as set forth in claim 3, wherein said plurality of component modeling means comprise a store buffer model and at least one simulated store buffer, said simulated store buffers being initialized for said instruction block, and updated after each of said scheduling of said free instructions.

17. The method for cost-based heuristic instruction scheduling for execution in a pipelined processor as set forth in claim 3, wherein said plurality of cost heuristics are weighted by multiplying in said pipeline processor an assigned weight to each individual cost heuristic so as to reflect the relative importance of each individual cost heuristic.

18. An apparatus for scheduling cost-based heuristic instructions for execution in a pipelined processor, said instructions comprising definitions, resources for use in said pipeline processor, or definitions and resources for use in said pipelined processor, said apparatus comprising:

a driver means for driving said cost-based heuristic instruction scheduling for an instruction block comprising a plurality of instructions to be scheduled, said driver means comprising an interface for receiving said instruction block;

a dependency graph building means coupled to said driver means for building an instruction dependency graph data structure for said instruction block, said instruction dependency graph data structure comprising said plurality of instructions arranged in a serial relationship such that a higher level instruction will precede a lower level instruction when definitions or use of a resource of said higher level instruction are necessary for said pipelined processor to execute said lower level instruction;

a list building means coupled to said driver means for building a free instruction list data structure for said instructions, said free instructions comprising said instructions in said dependency graph data structure which do not have a higher level preceding instruction; and processor modeling means for modeling said plurality of cost heuristics, said processor modeling means comprising a time passage simulation means and a plurality of component modeling means, said time passage simulation means simulates clock cycles and instruction execution in said pipelined processor for said free instruction based on said component modeling means for said free instruction to ascertain a plurality of cost heuristics, said processor modeling means being initialized for said instruction block;

a scheduling means coupled to said driver means and said processor modeling means for scheduling one of said free instructions, said scheduling means computing a total cost for each free instruction by summing said plurality of cost heuristics and scheduling for execution in said pipelined processor one of said free instructions based on a lowest total cost wherein execution time pipeline interlocks in said pipelined processor are reduced thereby improving execution speed in said pipelined processor for said plurality of instructions in said instruction block.

19. The apparatus for cost-based heuristic instruction scheduling for execution in a pipelined processor as set forth in claim 18, wherein said list building means further comprises a list building refreshing means, said refreshing means being invoked by said driver means for refreshing said free instruction list data structure for the remaining instructions based on said instruction dependency graph data structure after said scheduling means scheduled said free instruction, said list building means excludes said scheduled instruction and includes said instructions that become free due to said scheduled instruction;

processor modeling means further comprises updating means for updating said component modeling means after scheduling each of said free instructions and component modeling refreshing means for simulating clock cycles and instruction execution in said pipelined processor for each of said free instructions so as to determine a plurality of cost heuristics by accessing said component modeling means; and said scheduling means further comprises a scheduling refreshing means, said scheduling refreshing means being invoked by said driver means again for scheduling another one of said refreshed list of free instructions by computing a total cost for each free instruction by summing said plurality of cost heuristics determined from said processor modeling means.

20. The apparatus for cost-based heuristic instruction scheduling for a pipelined processor as set forth in claim 19, wherein said list building means, processor modeling means and said scheduling means further comprises a repeating means, said repeating means being invoked by said driver means for repeating said refreshing and said scheduling until said instructions of said instruction block are all scheduled.

21. The apparatus for cost-based heuristic instruction scheduling for a pipelined processor as set forth in claim 20, wherein said plurality of cost heuristics comprise a resource dependency cost, said resource dependency cost equaling the number of hold cycles due to resource dependencies caused by scheduling said free instruction.

22. The apparatus for cost-based heuristic instruction scheduling for a pipelined processor as set forth in claim 20, wherein said plurality of cost heuristics comprise a data dependency cost, said data dependency cost equaling the number of data interlocks due to data dependencies caused by scheduling said free instruction.

23. The apparatus for cost-based heuristic instruction scheduling for a pipelined processor as set forth in claim 20, wherein said plurality of cost heuristics comprise a dependency wait cost, said dependency wait cost equaling the number of extra wait cycles for resources caused by scheduling said free instruction.

24. The apparatus for cost-based heuristic instruction scheduling for a pipelined processor as set forth in claim 20, wherein said plurality of cost heuristics comprise a dependent cycle cost (DCC), said dependent cycle cost (DCC) equaling $-DC/\max(1, RC-DC)$, where DC equals the number of dependent cycles on said free instruction, RC equals the number of cycles required for the remaining instructions of said instruction block.

25. The apparatus for cost-based heuristic instruction scheduling for a pipelined processor as set forth in claim 20, wherein said plurality of cost heuristics comprise a floating point ratio cost (FPRC), said floating point ratio cost (FPRC) equaling $(RFPC/RNFPC) - FPTR$, where RFPC equals the number of floating point cycles required for the remaining instructions of said instruction block after scheduling said free instruction.

RNFPC equals the number of non-floating point cycles required for the remaining instructions of said instruction block after scheduling said free instruction, FPTR equals a floating point target ratio of floating point cycles required to non-floating point cycles required for said instruction block.

26. The apparatus for cost-based heuristic instruction scheduling for a pipelined processor as set forth in claim 25, wherein said floating point target ratio (FPTR) is adjustable, said floating point target ratio (FPTR) being adjusted after each of said scheduling of said free instructions.

27. The apparatus for cost-based heuristic instruction scheduling for a pipelined processor as set forth in claim 20, wherein said plurality of cost heuristics comprise a store ratio cost (SRC), said store ratio cost (SRC) equaling $(RSIC/RNSIC) - SITR$, where RSIC equals the number of store instruction cycles required for the remaining instructions of said instruction block after scheduling said free instruction, RNSIC equals the number of non-store instruction cycles required for the remaining instructions of said instruction block after scheduling said free instruction, SITR equals a store instruction target ratio of store instruction cycles required to non-store instruction cycles required for said instruction block.

28. The apparatus for cost-based heuristic instruction scheduling for a pipelined processor as set forth in claim 27, wherein said store instruction target ratio (SITR) further comprises store instruction target ratio adjustable means, said store instruction target ratio (SITR) adjustable means being adjusted after each of said scheduling of said free instructions.

29. The apparatus for cost-based heuristic instruction scheduling for a pipelined processor as set forth in claim 20, wherein said plurality of cost heuristics comprise a floating point queue cost (FPQC), said floating point queue cost (FPQC) equaling zero for said free instruction that is a non-floating point instruction, and equaling $FSIU - AFQS$ for said free instruction that is a floating point instruction, where FSIU equals the number of floating point operations currently being held in the floating point queue, and AFQS is the initial number of slots available on the floating point queue for holding floating point operations.

30. The apparatus for cost-based heuristic instruction scheduling for a pipelined processor as set forth in claim 20, wherein said plurality of component modeling means comprise a resource model and at least one resource table, said resource tables being initialized for said instruction block, and updated after each of said scheduling of said free instructions.

31. The apparatus for cost-based heuristic instruction scheduling for a pipelined processor as set forth in claim 20, wherein said plurality of component modeling means comprise a data dependency model and at least one data dependency table, said data dependency tables being initialized for said instruction block, and updated after each of said scheduling of said free instructions.

32. The apparatus for cost-based heuristic instruction scheduling for a pipelined processor as set forth in claim 20, wherein said plurality of component modeling means comprise a floating point unit model and at least one simulated floating point unit queue, said simulated floating point unit queues being initialized for said instruction block, and updated after each of said scheduling of said free instructions.

33. The apparatus for cost-based heuristic instruction scheduling for a pipelined processor as set forth in claim 20, wherein said plurality of component modeling means comprises a store buffer model and at least one simulated store buffer, said simulated store buffers being initialized for said instruction block, and updated after each of said scheduling of said free instructions.

34. The apparatus for cost-based heuristic instruction scheduling for a pipelined processor as set forth in claim 20, wherein said scheduling means further comprises a weighting means, said weighting means weights said plurality of cost heuristics by multiplying an assigned weight to each individual cost heuristic so as to reflect the relative importance of each individual cost heuristic.

* * * * *